United States Patent
Shapiro

(10) Patent No.: US 7,334,221 B1
(45) Date of Patent: Feb. 19, 2008

(54) SYSTEM AND METHOD FOR ENCODING TRACE FRAMEWORK ENABLING IN AN OBJECT FILE

(75) Inventor: Michael W. Shapiro, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 755 days.

(21) Appl. No.: 10/714,244

(22) Filed: Nov. 14, 2003

(51) Int. Cl.
*G06F 9/44* (2006.01)

(52) U.S. Cl. .................. 717/128; 717/127; 717/136

(58) Field of Classification Search ......... 717/124–128
See application file for complete search history.

(56) References Cited

U.S. PATENT DOCUMENTS

| 5,655,121 A | * | 8/1997 | Delagi et al. ............... 717/124 |
| 6,678,883 B1 | * | 1/2004 | Berry et al. ................ 717/128 |
| 2002/0095660 A1 | * | 7/2002 | O'Brien et al. ............. 717/127 |

OTHER PUBLICATIONS

Murayama, John; "Performance Profiling Using TNF"; [Online]; http://developers.sun.com/solaris/articles/tnf.html, Jul. 2001.*
Tamches, Ariel and Miller, Barton P; Fine-Grained Dynamic Instrumentation of Commodity Operating System Kernels; [Online]; http://www.usenix.org/publications/library/proceedings/osdi99/full_papers/tamches/tamches.pdf, Published Feb. 1999.
Murayama, John; "Performance Profiling Using TNF"; [Online]; http://developers.sun.com/solaris/articles/tnf.html, Jul. 2001.
Lorch, Jacob R. and Smith, Alan J.; "The Vtrace Tool: Building a system Tracer for Windows NT and Windows 2000"; [Online] http://msdn.microsoft.com/msdnmag/issues/1000/Vtrace/default.aspx, Oct. 2000.
"Chapter 10. The Generalized Trace Facility (GTF)"; [Online]; http://publib.boulder.ibm.com/cgi-bin/bookmgr/BOOKS/IEA2V100/CCONTENTS, Jan. 2001.
Mirgorodskii, Alex; " The Path to Portable Kernel Instrumentation: The Kerninst API"; http://www.dyninst.org/mtg2003/slides/KerninstAPI.pdf, Apr. 2003.
Richard Moore, et al.; "IBM Dynamic Probes"; http://www-124.ibm.com/developerworks/opensource/linux/projects/dprobes/README, 2000.
K. Yaghmour et al.; "Measuring and Characterizing System Behavior Using Kernel-Level Event Logging"; Proceedings of the 2000 USENIX Annual Technical Conference; Jun. 18-23, 2000, San Diego, California, USA.

(Continued)

*Primary Examiner*—Meng-Al T. An
*Assistant Examiner*—Michael Yaary
(74) *Attorney, Agent, or Firm*—Osha Liang LLP

(57) ABSTRACT

A method for formatting an object file including generating a trace object code from trace source code, and processing component information of the trace object code to generate the object file, wherein the object file comprises a linear sequence of bytes comprising a file header, a plurality of section headers, and a plurality of section data entries.

12 Claims, 3 Drawing Sheets

OTHER PUBLICATIONS

Microsoft Knowledge Base Article—121460; "Common Object File Format (COFF)," [Online] HTTP://SUPPORT.MICROSOFT.COM/DEFAULT.ASPX?SCID=KB;EN-US;Q121460.

Barlow, Daniel; "What is ELF? An Introduction"; [Online] 2.EDUC.UMU.SE/~BJORN/LINUX/HOWTO/ELF-HOWTO-1.HTML; Jul. 14, 1996.

* cited by examiner

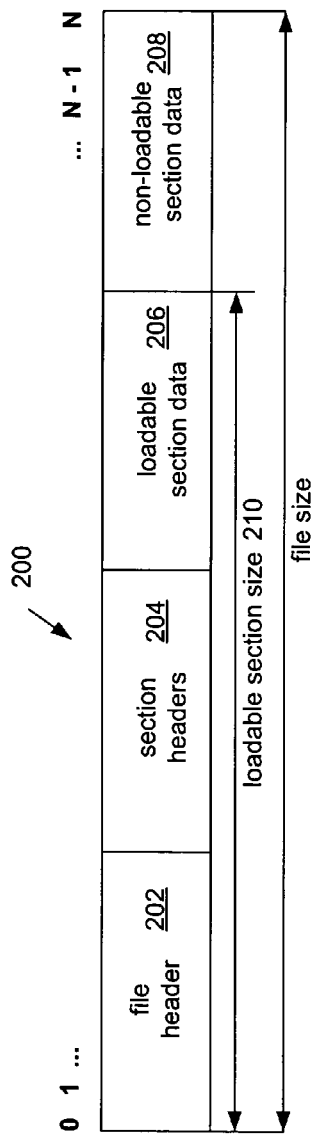

SYSTEM AND METHOD FOR ENCODING TRACE FRAMEWORK ENABLING IN AN OBJECT FILE

BACKGROUND

A tracing framework is a collection of software routines and tools that permit a user to instrument and record the activity of one or more executing programs, including an operating system kernel. Tracing frameworks typically permit users to describe instrumentation requests by naming one or more probes, which are locations of interest that can be used as data-recording sites within an instrumented program. Tracing frameworks also permit users to associate these probes with one or more actions. The actions describe what tracing operations should be performed when the executing instrumented program passes through the probe site (i.e., when a probe triggers). Tracing frameworks typically provide either a defined set of actions at each probe, a set of user-selectable actions, or the ability to execute an essentially arbitrary set of actions composed in a programming language (such as C, C++, or Pascal).

In tracing frameworks that support a programming language for describing actions, tracing operations (in the form of language statements) are compiled into an intermediate form or directly into machine code. The tracing operations are executed when a probe triggers. In tracing frameworks that compile probe descriptions and actions from a programming language into an intermediate form, the compiler is typically implemented as a user application that then communicates the results of the compilation to the operating system kernel where the probe instrumentation is performed. Communication is typically performed using one or more system calls or device driver calls combined with a set of data structures that together form a binary interface between the trace program compiler and the tracing framework instrumentation service.

The structure of tracing programs can be somewhat complex; likewise the associated data structures are often complex and bind the implementation artifacts of the trace program compiler tightly with the operating system service. A traditional mechanism for separating compiler implementation artifacts for encoding an executable program from the executing operating system service is to define an object file format. Traditional programming language compilers for all operating systems typically encode their compiled output object code in a file format that is well-documented and able to be processed by the operating system.

Two common such object file formats supported by modern operating systems are Executable and Linkable Format (ELF) and Common Object File Format (COFF). The design of these file formats is centered around the encoding of traditional user program concepts, such as (1) a single, well-defined entry point for the program (e.g., in C and C++, the routine named "main" or an operating system wrapper around it named "_start"); and (2) a single set of sections associated with the program (e.g., the program object code and the program data) that are to be loaded into memory by the operating system before executing the program.

A tracing program is unlike a traditional program written in a programming language because it has no notion of a single entry point and linear or threaded flow of control. Instead, a tracing program acts as a symbiotic entity acting in response to the control flow of another program: the instrumented program that is being traced. Each tracing program probe description is effectively a potential entry point into the trace program, and multiple entry points can occur in parallel if the traced program itself is multi-threaded. As a result of these differences, existing tracing frameworks that support persistent storage of compiled tracing programs have not used object file formats and have instead chosen to encode tracing programs using various arrangements of the in-memory data structures used to communicate the tracing program to the instrumentation service.

SUMMARY

In general, in one aspect, an embodiment of the invention relates to a method for formatting an object file comprising generating a trace object code from trace source code, and processing component information of the trace object code to generate the object file, wherein the object file comprises a linear sequence of bytes comprising a file header, a plurality of section headers, and a plurality of section data entries.

In general, in one aspect, an embodiment of the invention relates to a data structure defining an object file comprising a file header, a list of section headers appended to the file header, and a plurality of section data, wherein the section data comprises loadable section data and non-loadable section data, wherein, the object file comprises the file header, the list of section headers, the plurality of section data and is generated by processing component information of a trace object code.

In general, in one aspect, an embodiment of the invention relates to a computer system for formatting an object file comprising a processor, a memory, a storage device, and software instructions stored in the memory for enabling the computer system to generate a trace object code from trace source code, and process component information of the trace object code to generate the object file, wherein the object file comprises a linear sequence of bytes comprising a file header, a plurality of section headers, and a plurality of section data entries.

Other aspects of embodiments of the invention will be apparent from the following description and the appended claims.

BRIEF DESCRIPTION OF DRAWINGS

FIG. 2 shows a graphical representation of an object file in accordance with one embodiment of the invention.

FIG. 3 shows a graphical representation of a list of section headers in accordance with one embodiment of the invention.

FIG. 4 shows a graphical representation of section data in accordance with one embodiment of the invention.

DETAILED DESCRIPTION

Figure 1:
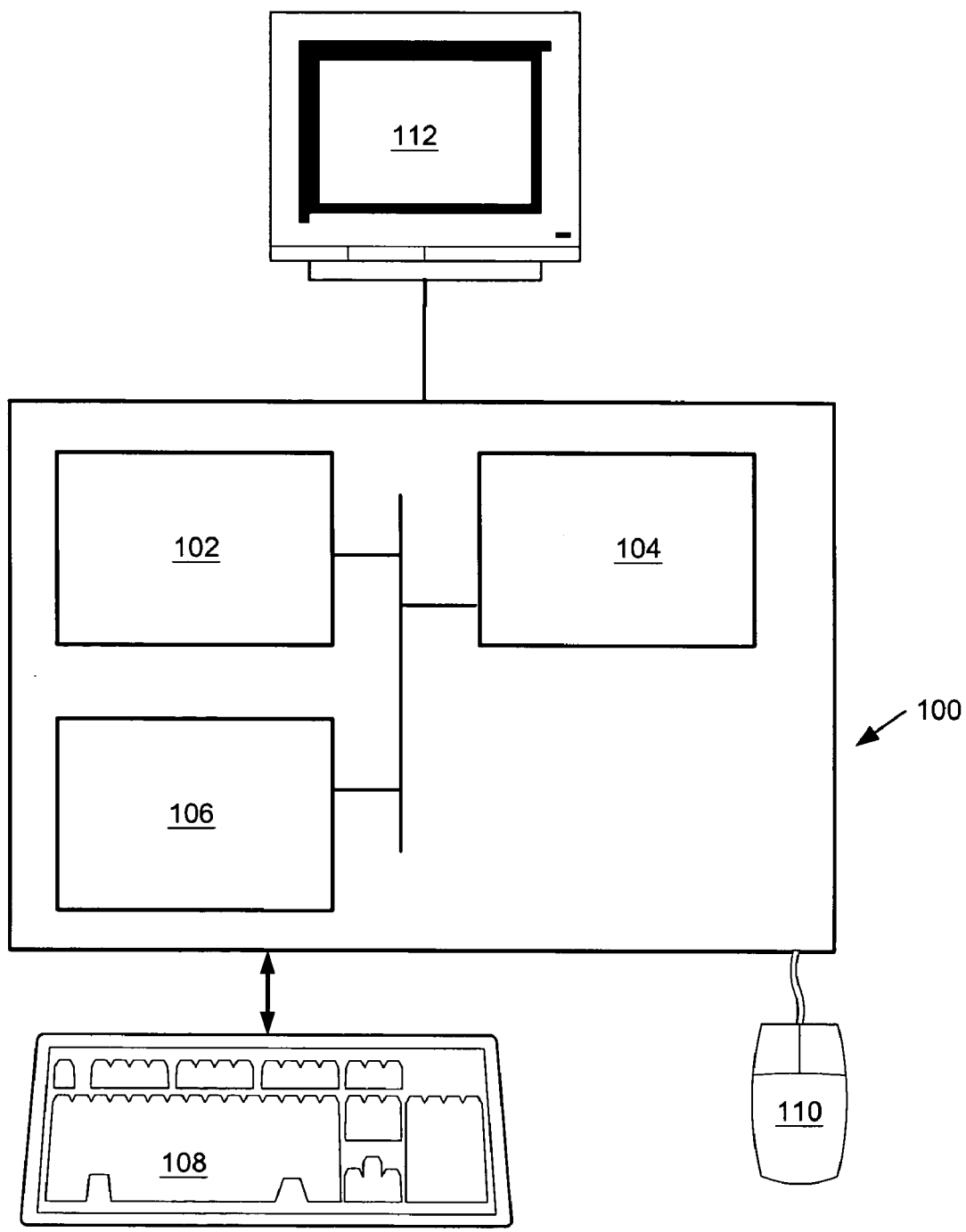
FIG. 1 shows a networked computer system in accordance with one embodiment of the invention.

Exemplary embodiments of the invention will be described with reference to the accompanying drawings. Like items in the drawings are shown with the same reference numbers.

In the following detailed description of an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

An embodiment of the invention may be implemented on virtually any type of computer regardless of the platform being used. For example, as shown in FIG. 1, a networked computer system (100) includes a processor (102), associated memory (104), a storage device (106), and numerous other elements and functionalities typical of today's computers (not shown). The networked computer (100) may also include input means, such as a keyboard (108) and a mouse (110), and output means, such as a monitor (112). The networked computer system (100) is connected to a local area network (LAN) or a wide area network (e.g., the Internet) via a network interface connection (not shown). Those skilled in the art will appreciate that these input and output means may take other forms. Further, those skilled in the art will appreciate that one or more elements of the aforementioned computer (100) may be located at a remote location and connected to the other elements over a network.

In one embodiment, the present invention relates to a new object file format structure that encodes a tracing framework enabling. Specifically, an extensible object format is defined for tracing framework enablings and an example of the extensible object format, referred to as the DTrace Output Format (DOF), is described in detail. In an embodiment of the invention, several properties of the DOF, which are referred through in detail below, allow for the independent evolution of the tracing framework compiler and the instrumentation service, as well as the efficient transfer of the tracing framework enabling from the compiler to the service.

A graphical representation of an object file format for encoding a tracing framework enabling is shown in FIG. 2 in accordance with one embodiment of the invention. The object file format shown in FIG. 2 has been defined for use with a tracing framework instrumentation service. The object file format can be used to store the compiled form of tracing programs that typically include one or more probe descriptions. Each probe description has an optional predicate and list of actions represented by a set of compiled object code for an instrumentation service's virtual machine. The object file format is versioned and extensible so that it can be revised, and so that internal data structures can be modified or extended in a compatible manner. In an embodiment of the invention, structures of the object file format use fixed-size types, so a 32-bit and a 64-bit representation are identical and consumers can use either data model transparently.

As shown in FIG. 2, in one embodiment of the invention, the object file layout is structured as a linear sequence of bytes 0 . . . N that may be organized as follows. The file header (202) is the initial segment of bytes. The file header stores meta-data including a magic number, data model for the instrumentation, data encoding, and properties of the DTrace Intermediate Format (DIF)-type (i.e., an instruction format for an instrumentation service's virtual machine) code within. The file header (202) describes its own size and the size of the various section headers (204). By convention, an array (or list) of section headers (204) follows the file header (202), and then the section data for all loadable sections (206) and unloadable sections (208) follow. In one embodiment of the invention, this arrangement permits a compiler to transmit the headers (202, 204) and all loadable data (206) required by the instrumentation service to this service is a single memory copy or file read operation of the bytes 0 . . . loadable section size (210).

In an embodiment of the invention, these features of the object file format described above provide the following properties: (a) the object file includes a linear sequence of bytes containing the file header (202), a list of section headers (204), and a list of section data entries (206, 208); (b) the sections (206, 208) are divided into those that are required by the trace framework for enabling the instrumentation (206) and those that are not (208); (c) the section data regions for all sections (206) that are required by the trace framework are encoded prior to any section data regions (208) for those that are not required; and (d) an arbitrary number of data sections defined as probe-enabling and, therefore, type "enabling control block" (ECB), may appear in the object file, limited only by the size of the data representation for the file.

As shown in FIG. 2, in accordance with an embodiment of the invention, each section of the object file (200) as defined in the list of section headers (204) is uniquely named by an integer which represents its index in the array of section headers. The section headers describe the size, offset, alignment, and section type for each section. In one embodiment, sections are described using a set of integers that define the kind of data in the section. Sections can contain links to other sections by storing an integer index into the section header array inside of the data region for a given section. In one embodiment, the section header includes an entry size so that sections with data arrays can grow their structures (as shown by the dotted references associated with the loadable section (204) and the non-loadable section (206)).

FIG. 3 shows a graphical representation of a list of section headers in accordance with one embodiment of the invention. FIG. 3 shows a magnification of the section header array (300) and the integer indices labeling each section. The data values D0-D6 are associated with specific section headers (302, 304, 306, 308, 310, 312, 314) and are labels that, in one embodiment of the invention, are actually the byte offset within the object file stream of the data region corresponding to this section.

In an embodiment of the invention, these features of the object file format described above provide the following properties: (a) each section header in the section header list (204) is given a unique identifier within the file (for example, a unique integer index or string name); and (b) each section header in the section header list (204) is associated with a data element that defines the type of data contained in this section.

FIG. 4 shows a graphical representation of section data in accordance with one embodiment of the invention. FIG. 4 shows a magnification of part of the section data contents (400) for sections 4, 5, and 6 (402, 404, 406) in FIG. 3. The data in region D4 (402) indicates the section indices of the sections that form a DIFO (corresponding to the type in 310 of FIG. 3) for this compiled piece of code (0, 1, 2, and 3). The data in region D5 (404) indicates that the requested action is to execute the DIFO described by section 4 (402). The data in region D6 (406) indicates that the probe actions are described by the contents of the data region for section 5 (404).

As shown in FIG. 3, section types DIFO (310), action (312), and ECB 314) are maintained in separate data sections. This arrangement is dictated by the type of object code (and its corresponding component information) that stored in those sections. In an embodiment of the invention, a method of handling object code for a logical predicate and/or list of actions associated with a probe, and the probe enabling is discussed below.

When a particular logical predicate or list of actions is compiled, it is compiled into a data structure that represents the elements of a traditional program object file. In one embodiment of the invention, the elements of the data structure include: (a) a list of binary instructions to be executed by the instrumentation service's virtual machine when the corresponding probe fires; (b) an optional string table representing ASCII strings referenced by the binary instruction stream in (a); (c) an optional variable table representing variable storage provided by the instrumentation service that is read or written by the instruction stream; and (d) a return type description indicating the type and size of the total data that is traced as the result of the actions in the instruction stream. The instruction stream in (a) is encoded in the DIF "format." Therefore, the set of data elements (a)-(d) is a DIF object (DIFO) because these elements include the equivalent of a traditional object file for a particular program predicate or action statement list.

In one embodiment of the invention, a section type constant is defined in DOF to denote all sections of type DIFO, and each DIFO section's data region is designed to include of an array of integers representing the section indices for the sections corresponding to elements (a)-(d), as well as any other sections associated with the DIFO by the compiler. For example, a copy of the human-readable source code or compiler settings could be stored in additional sections, even though this information is not needed by the instrumentation service to enable the probes.

In an embodiment of the invention, these features of the object file format described above provide the following property. Each data section defined as probe-enabling has in its data region a list of unique section identifiers. The section identifiers identify the sections of the file that contain the elements of a traditional program object file associated with this probe, as well as any other sections the compiler relates to the probe.

A probe enabling is described by a section of type ECB, which includes a probe name to enable, the integer name of the section representing the DIFO for the predicate, if any, and the integer names of zero or more sections representing the actions. Each action section either contains information describing a predefined action to take as provided by the instrumentation service, or contains the integer name of a DIFO section with the indication that the virtual machine should execute that program object code. Therefore, in one embodiment of the invention, the instrumentation service can scan the list of section headers in a single pass, identifying each section of type ECB, and then enable the corresponding probes and build any data structures required to execute the associated predicates and actions referenced by the ECB.

In an embodiment of the invention, these features of the object file format described above provide the following property. A particular section type is defined to refer to the enabling of a probe or set of probes offered by the tracing framework to its clients.

Figure 5:
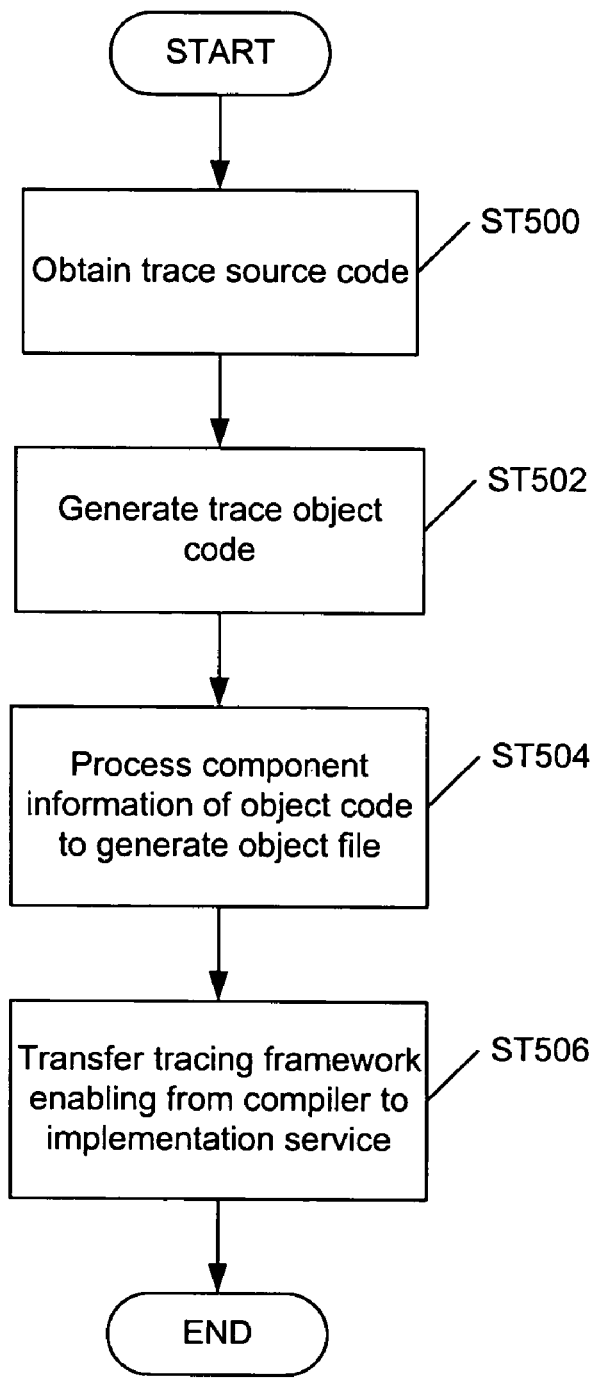
FIG. 5 shows a flowchart of generating an object file in accordance with one embodiment of the invention.

FIG. 5 shows a flowchart of generating an object file in accordance with one embodiment of the invention. Initially trace source code is obtained, generated, or accessed via a command line or graphical user interface (Step 500). Next, trace object code is generated from the trace source code using a compiler (Step 502). In one embodiment of the invention, this trace object code may also be obtained in intermediate form through the use of an interpreter. Next, in one embodiment of the invention, the component information of the trace object code is processed to generate a formatted object file (Step 504) as shown in FIG. 2 and described above. In one embodiment of the invention, the component information of the trace object code is generated by parsing the trace object code. Once the object file is generated, the tracing framework enabling can be transferred from the compiler to the implementation service (Step 506).

Embodiments of the invention may have one or more of the following advantages. The invention supports parallel evolution of the tracing framework compiler and instrumentation service. The invention also provides efficient transfer between the compiler and this service. The invention can be used uniformly in all mechanisms provided by the tracing framework for enabling or verifying instrumentation, and allows for stable, persistent storage of compiled tracing programs.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracing a program comprising:
   generating a trace object code from trace source code;
   processing component information of the trace object code to generate an object file;
     wherein the object file comprises a linear sequence of bytes comprising:
       a file header,
       a first section header of type enable control block (ECB),
       a second section header of type action,
       a first section data entry associated with the first section header comprising a name of a probe to enable and a name of a second section data entry of type action,
       the second section data entry associated with the second section header defining at least one selected from a group consisting of a predefined action and a name of a third section data entry of type program object corresponding to an action, and
       a third section header comprising a name of a fourth section data entry comprising program object code associated with a predicate, wherein the program object code associated with the predicate is executed when the probe is encountered during tracing;
   parsing the object file, by a tracing framework, to enable the probe in the program;
   tracing the program, wherein tracing the program comprises encountering the probe;
   executing at least one selected from a group consisting of the predefined action and the action associated with the probe to obtain data.

2. The method of claim 1, further comprising:
   saving the object file in a persistent data store.

3. The method of claim 1, wherein the trace source code comprises a probe description associated with the probe, wherein the probe description comprises an optional predicate and the action.

4. The method of claim 1, wherein processing component information comprises:
   assigning a unique identifier for each section header in the plurality of section headers.

5. The method of claim 1, wherein the third section the third section data entry comprises the program object code corresponding to the action.

6. The method of claim 5, wherein the program object code is executed by a virtual machine.

7. A computer system tracing a program comprising:
a processor;
a memory;
a storage device; and
software instructions stored in the memory for enabling the computer system to:
generate a trace object code from trace source code;
process component information of the trace object code to generate the object file,
wherein the object file comprises a linear sequence of bytes comprising:
a file header,
a first section header of type enable control block (ECB),
a second section header of type action,
a first section data entry associated with the first section header comprising a name of a probe to enable and a name of a second section data entry of type action,
the second section data entry associated with the second section header defining at least one selected from a group consisting of a predefined action and a name of a third section data entry of type program object corresponding to an action, and
a third section header comprising a name of a fourth section data entry comprising program object code associated with a predicate,
wherein the program object code associated with the predicate is executed when the probe is encountered during tracing;
parse the object file, by a tracing framework, to enable the probe in the program;
trace the program, wherein tracing the program comprises encountering the probe;
execute at least one selected from a group consisting of the predefined action and the action associated with the probe to obtain data.

8. The computer system of claim 7, wherein processing component information comprises software instructions stored in the memory for enabling the computer system to:
assign a unique identifier for each section header in the plurality of section headers.

9. The computer system of claim 7, further comprising software instructions stored in the memory for enabling the computer system to:
save the object file in a persistent data store.

10. The computer system of claim 7, wherein the trace source code comprises a probe description associated with the probe, wherein the probe description comprises an optional predicate and action.

11. The computer system of claim 7, wherein the third section data entry comprises the program object code corresponding to the action.

12. The computer system of claim 11, wherein the program object code is executed by a virtual machine.

* * * * *